(12) United States Patent
Chen et al.

(10) Patent No.: US 10,366,037 B2
(45) Date of Patent: Jul. 30, 2019

(54) METHOD FOR MANAGING DOCKING DEVICE AND DOCKING DEVICE

(71) Applicant: I/O INTERCONNECT, LTD., Santa Ana, CA (US)

(72) Inventors: Johnny Hsiang-Yu Chen, Taipei (TW); Chih-Hsiung Chang, Taipei (TW); Tsung-Min Chen, Taipei (TW); Hsiang-Ling Wang, Taipei (TW)

(73) Assignee: I/O INTERCONNECT, LTD., Santa Ana, CA (US)

(*) Notice: Subject to any disclaimer, the term of this patent is extended or adjusted under 35 U.S.C. 154(b) by 50 days.

(21) Appl. No.: 15/605,203

(22) Filed: May 25, 2017

(65) Prior Publication Data

US 2017/0344507 A1 Nov. 30, 2017

Related U.S. Application Data

(63) Continuation-in-part of application No. 15/213,396, filed on Jul. 19, 2016, now abandoned, and a continuation-in-part of application No. 15/213,347, filed on Jul. 18, 2016, now abandoned.

(60) Provisional application No. 62/377,589, filed on Aug. 21, 2016, provisional application No. 62/342,224, filed on May 27, 2016.

(51) Int. Cl.
*G06F 13/38* (2006.01)
*G06F 13/40* (2006.01)
*G06F 13/42* (2006.01)

(52) U.S. Cl.
CPC ...... *G06F 13/4081* (2013.01); *G06F 13/4282* (2013.01)

(58) Field of Classification Search
CPC .................................. G06F 13/38; G06F 13/40
See application file for complete search history.

(56) References Cited

U.S. PATENT DOCUMENTS

| 2004/0019732 | A1* | 1/2004 | Overtoom | G06F 13/4022 710/313 |
| 2013/0304942 | A1* | 11/2013 | Golembeski | G06F 13/385 710/14 |
| 2014/0173141 | A1* | 6/2014 | Waters | G06F 1/22 710/16 |
| 2014/0208134 | A1* | 7/2014 | Waters | G06F 13/385 713/310 |
| 2015/0378409 | A1* | 12/2015 | Dunstan | G06F 13/385 713/310 |
| 2016/0350251 | A1* | 12/2016 | Lee | G06F 13/4022 |

(Continued)

*Primary Examiner* — David E Martinez
(74) *Attorney, Agent, or Firm* — Locke Lord LLP; Tim Tingkang Xia, Esq.

(57) ABSTRACT

Present disclosure relates to a method for managing a docking device and the docking device thereof. The docking device is configured with a processor and at least two coupling ports. The method comprises following steps: electrically coupling a computer and/or at least one peripheral device to the at least two coupling ports respectively; retrieving a plurality of characteristic profiles by the processor, wherein each of the characteristic profiles is retrieved from each of the at least two coupling ports; receiving, by the processor, an input signal from the computer or the at least one peripheral device; and changing the characteristic profiles based on the input signal by the processor.

14 Claims, 4 Drawing Sheets

(56) References Cited

U.S. PATENT DOCUMENTS

2016/0378704 A1\* 12/2016 Adamson ............ G06F 13/364
                                                              710/104

\* cited by examiner

METHOD FOR MANAGING DOCKING DEVICE AND DOCKING DEVICE

CROSS-REFERENCE TO RELATED APPLICATION

This application claims priority to U.S. Provisional Application Ser. No. 62/377,589, filed on Aug. 21, 2016. This application is also a continuation-in-part of U.S. application Ser. No. 15/213,396, filed on Jul. 19, 2016, which itself claims priority to and the benefit of, pursuant to 35 U.S.C. § 119(e), U.S. provisional patent application Ser. No. 62/342,224, filed May 27, 2016. This application is also a continuation-in-part of U.S. application Ser. No. 15/213,347, filed on Jul. 18, 2016. All the above disclosures of which are incorporated herein in their entirety by reference.

BACKGROUND

Field of Invention

The present disclosure relates to an interface device, and a method for operating the interface device. More particularly, the present invention relates to a docking device, and a method for managing the docking device.

Description of Related Art

The USB (universal serial bus) Type-C cable is an interface having the same connectors to both ends of the host and device, which is anticipated as a replacement to the USB Type-B and Type-A interfaces because of its convenience.

Thanks to the improvements of USB technology, people dedicate to USB Type-C techniques are working on switching the direction of device-to-host interface, which may be applied to an intermediate device to reduce the inadvertent errors caused by users. However, the tendency of hardware development always aims for cutting redundancies and incorporating as much as functions in a single device. When several interface ports, including USB Type-C port, were built in the same intermediate device to connect with several types of equipment, how to manage the power or data exchange through the intermediate device is an open question for people in the art.

SUMMARY

The disclosure provides a method for managing a docking device having a processor and at least two coupling ports, the method comprises the steps as follows: electrically coupling a computer and/or at least one peripheral device to the at least two coupling ports respectively; retrieving a plurality of characteristic profiles from the at least two coupling ports by the processor, wherein each of the characteristic profiles is retrieved from each of the at least two coupling ports; receiving an input signal from the computer or the at least one peripheral device by the processor; and changing the profiles based on the input signal by the processor.

Another aspect of the disclosure is to provide a docking device for coupling a computer and/or at least one peripheral device, wherein the docking device comprises a processor and at least two coupling ports. Each of the at least two coupling ports is configured to couple to the computer and/or the at least one peripheral device. The processor of the docking device is configured to retrieve a plurality of characteristic profiles from the at least two coupling ports, wherein each of the characteristic profiles is retrieved from each of the at least two coupling ports. Wherein the processor is further configured to change the characteristic profiles based on the input signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
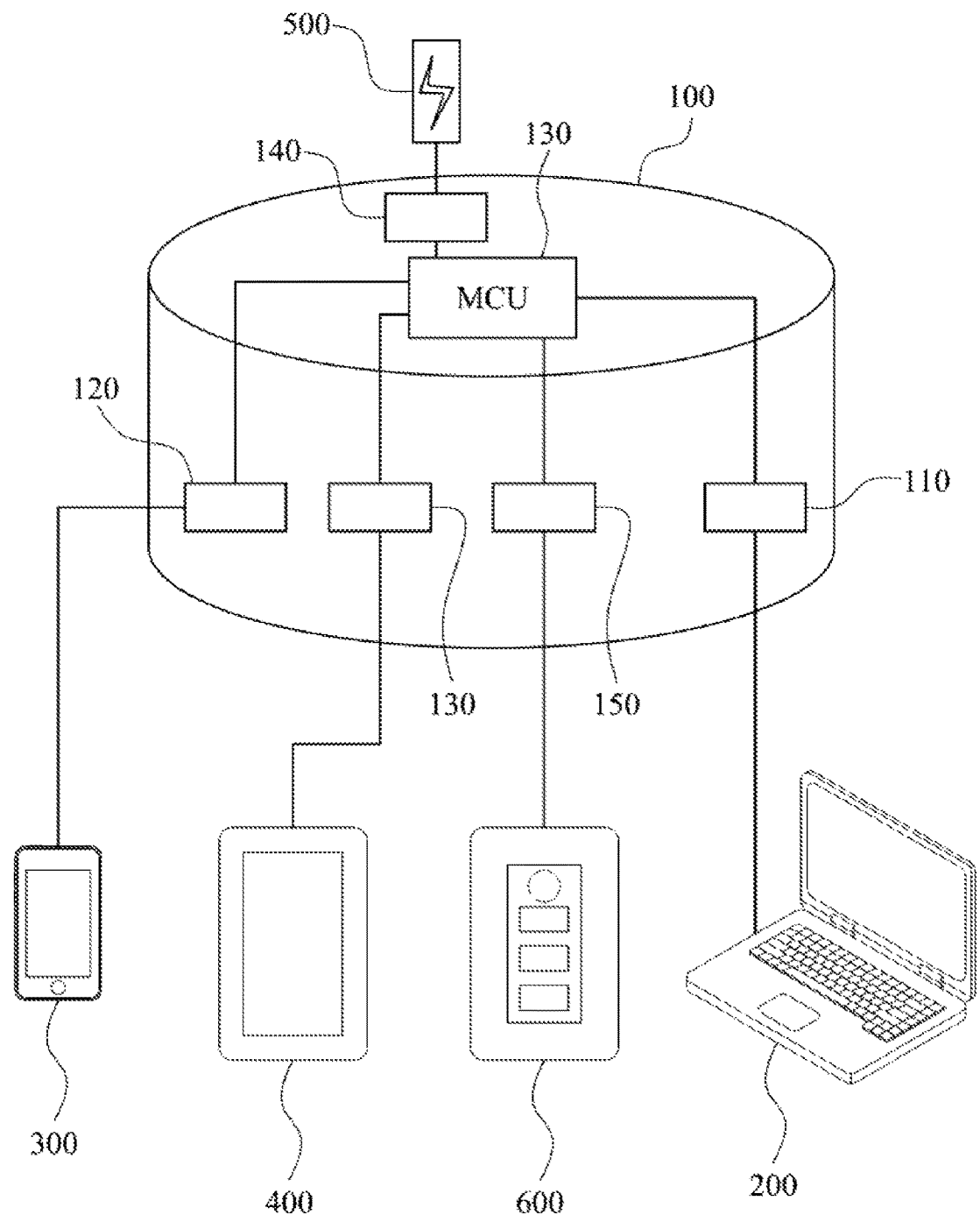
FIG. 1 is a schematic diagram of a docking device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a docking device according to one embodiment of the present disclosure. As illustrated in FIG. 1, the docking device 100 includes a first coupling port 110, a second coupling port 120, a third coupling port 130, a fourth coupling port 140, a fifth coupling port 150 and a MCU (Micro Controller Unit) 160. The MCU 160 is in electrical connection with all of the first coupling port 110, the second coupling port 120, the third coupling port 130, the fourth coupling port 140 and the fifth coupling port 150.

In foregoing embodiment, a laptop 200 is coupled to the docking device 100 via the first coupling port 110, a mobile phone 300 is coupled to the docking device 100 via the second coupling port 120, and a tablet 400 is coupled to the docking device 100 via the third coupling port 130. A power adaptor 500 is coupled to the docking device 100 via the fourth coupling port 140. In the exemplary embodiment, the laptop 200 is in operation so it demands power. The laptop 200 is able to be charged in three available modes, which are flash charging with 60 W (Watts), standard charging with 40 W or slow charging with 20 W, for example. The battery of the mobile phone 300 requires a power input of 20 W (Watts) for flash charging. The tablet 400 has a certain level of power storage and requires a power input of 20 W for standard recharging.

In the embodiment, the power adaptor 500 coupled to the docking device 100 is capable of providing a maximum power output of 80 W to the docking device 100 for safety reasons. If the docking device is a prior art, when the laptop 200, the mobile phone 300 and the tablet 400 were all coupled to the docking device, all of these peripheral devices would detect and recognize there is a power resource of 80 W. Each of them would try to gain as more power as possible based on their demands. As a possible consequence of the case, the power adaptor 500 may have to provide an overloading and dangerous output to supply all the peripheral devices.

However, in the embodiment of present disclosure, the MCU 160 is configured in the docking device 100 to manage the distribution or the direction of the power delivery. The MCU 160 is configured to visit the first coupling port 110, the second coupling port 120, the third coupling port 130 and the fourth coupling port 140 for retrieving the characteristic profiles stored therein.

Each of the first coupling port 110, the second coupling port 120, the third coupling port 130 and the fourth coupling port 140 are stored with a power profile according to the supplies or the demands of the peripheral device being coupled thereon. A power profile is retrieved from the first coupling port 110 coupled to the laptop 200, the power profile indicates that laptop 200 is a dual role end in power delivery and it requires up to 60 W for charging. A power demand profile is retrieved from the second coupling port 120 coupled to the mobile phone 300, the power profile indicates that mobile phone 300 is an upstream facing end in power delivery and it requires 20 W for charging. A power demand profile is retrieved from the third coupling port 130 coupled to the tablet 400, the power profile indicates that tablet 400 is an upstream facing end in power delivery and it requires 20 W for charging. A power supply profile is retrieved from the fourth coupling port 140 coupled to the power adaptor 500, the power profile indicates that power adaptor 500 is a downstream facing end in power delivery and it provides up to 80 W.

In the embodiment, the docking device 100 is configured with a priority setting for power delivery, for example, which is: mobile phone, tablet, laptop, ranked from the top to the last. The 20 W of power demand of the mobile phone 300 is the first priority to be fulfilled and the 20 W of power demand of tablet 400 is the second. When an input signal, which is the power current from the power adaptor 500, firstly received by the MCU 160, it starts to employ the power distribution by changing the characteristic profiles in the coupling ports. According to the priority settings, it should provide 20 W to the mobile phone 300 and provide 20 W to the tablet 400. Only 40 W remains to the laptop 200. Therefore, the MCU 160 changes the power profile in the fourth coupling port 140 to indicate that power adaptor 500 is a downstream facing end in power delivery and it provides only 40 W of power. Therefore, the laptop 200 detects the power adaptor 500 as a power resource with a capacity of 40 W, the laptop 200 may only retrieve 40 W of power.

In a modification of the foregoing embodiment, a power bank 600 is coupled to the docking device 100 through the fifth coupling port 150. The power bank is fully charged and is able to provide a power supply of 20 W. When the power bank 600 being coupled to the docking device 100, a power profile is stored in the fifth coupling port 150 and retrieved by the MCU 160, wherein the power profile indicates that power bank 600 is a downstream facing end in power delivery and it provides up to 20 W. With additional power supply from the power bank 600, the MCU 160 may distribute the 20 W of power from the power bank 600 to the mobile phone 300 for fulfilling its first priority. Therefore, the total 80 W of power from the power adaptor 500 would be re-distributed to other peripheral devices by 20 W to the tablet 400 and 60 W to the laptop 200. The laptop 200 is now able to be charged by 60 W. As the same, the re-distribution is employed by changing the power profile in the fourth coupling port 140 to indicate that power adaptor 500 is a downstream facing end in power delivery and it provides 60 W of power.

Figure 2:
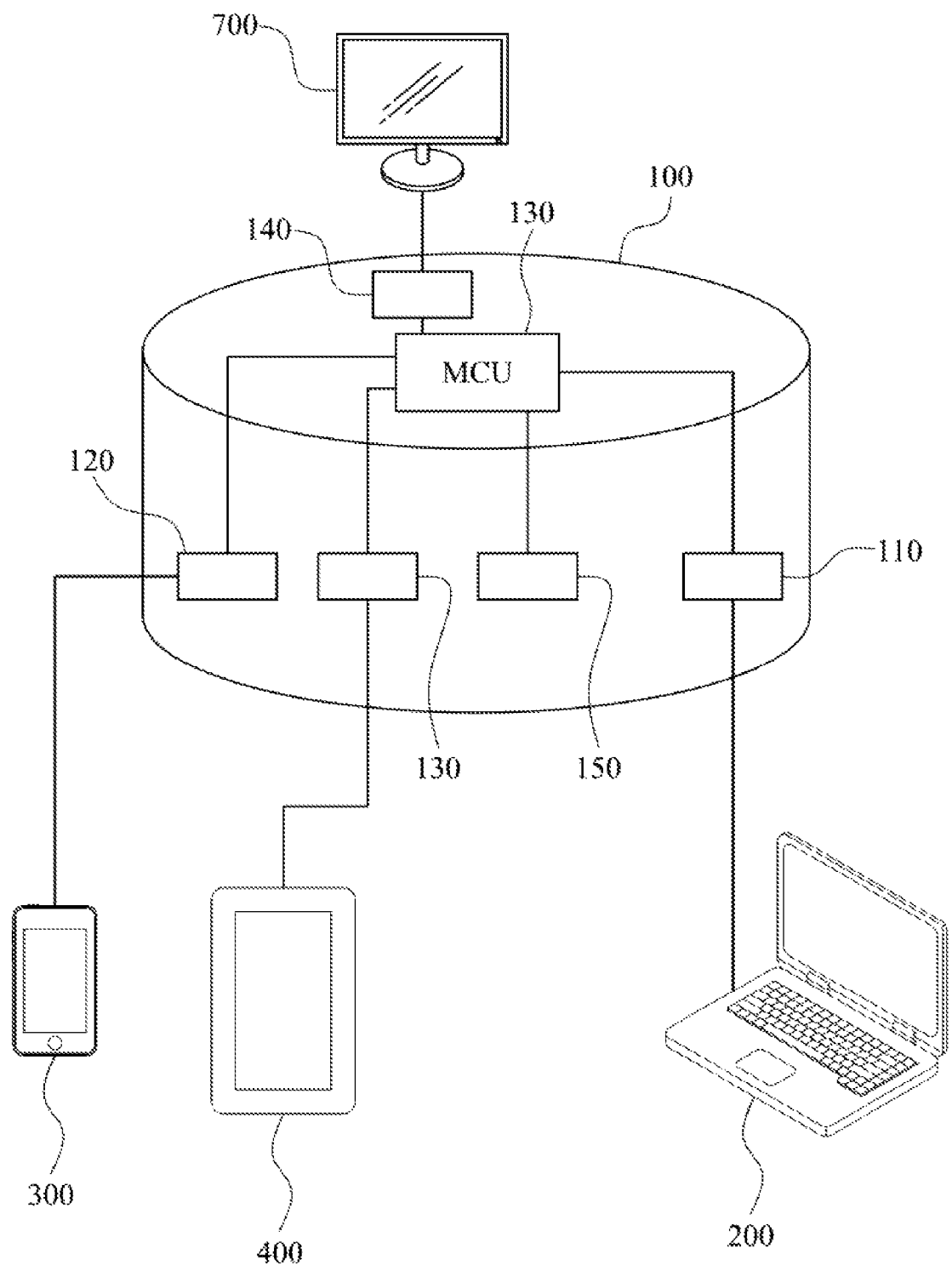
FIG. 2 is a schematic diagram of a docking device according to some other embodiments of the present disclosure.

FIG. 2 is a schematic diagram of a docking device according to another embodiment of the present disclosure. The MCU 160 is configured to manage the data transfer through the docking device 100 as well. Similar to the embodiment of FIG. 1, a laptop 200 is coupled to the docking device 100 via the first coupling port 110 (for example, USB Type-C), a mobile phone 300 is coupled to the docking device 100 via the second coupling port 120 (for example, USB 3.0), and a tablet 400 is coupled to the docking device 100 via the third coupling port 130 (for example, USB 3.0). Differently, the fourth coupling port 140 is coupled with a monitor 700 supports 4K (Ultra HD, UHD) resolution display. A 4K resolution profile is generated and stored in the fourth coupling port 140 when the monitor 700 being coupled thereto. The 4K resolution profile is then retrieved by the MCU 160 in a visit. If the docking device 100 is a prior art, when the monitor 700 is utilized as a display of the laptop 200, a data communication in Ultra HD (4K/60 Hz) would be held between the laptop 200 and the monitor 700. As a consequence, the data transfer rate between the mobile phone 300 (Or the tablet 400) to the laptop 200 would be seriously delayed (down to the data transfer rate of USB 2.0) due to the data transfer rate limitations of the bandwidth of USB type-C.

However, in the embodiment of present disclosure, the MCU 160 is configured in the docking device 100 to manage the distribution or the direction of the data transformation. The MCU 160 may change the 4K resolution profile stored in the fourth coupling port 140 and/or stored in the first coupling port 110 to a HDMI (High Definition Multimedia Interface) resolution profile for reducing the data transfer rate between the laptop 200 and the monitor 700. The data transfer rate between the mobile phone 300 (Or the tablet 400) to the laptop 200 is therefore increased. When the docking device 100 is coupled to a VGA, HDMI or other display interfaces, the MCU 160 is able to manage the data transfer by changing the video resolution profiles in the coupling ports accordingly.

In some embodiments of present disclosure, the configuration of the docking device 100 may be selectively modified to couple to many types of interfaces, such as mentioned USB Type-C, mentioned USB Type-A, USB Type-B port, USB micro B, Ethernet, card reader, parallel port, VGA (Video Graphics Array), HDMI (High Definition Multimedia Interface), other display port or power resource ports. A plurality of characteristic profiles are generated and stored in accordance with the available functions, modes or demands of the computer or the at least one peripheral device through the coupling ports. The MCU 160 is able to retrieve and change characteristic profiles in the coupling ports for distributing or re-distributing power or data to the coupled peripheral devices. In addition, the MCU 160 of the docking device 100 is further configured to send the plurality of characteristic profiles to a USB control module, wherein the USB control module is configured on the laptop 200 or other peripheral devices. In some embodiments, an application with a user interface is executable on the computer. The application may communicate with the MCU through USB interface. Accordingly, the user may change characteristic profiles in the coupling ports through the user interface.

Figure 3:
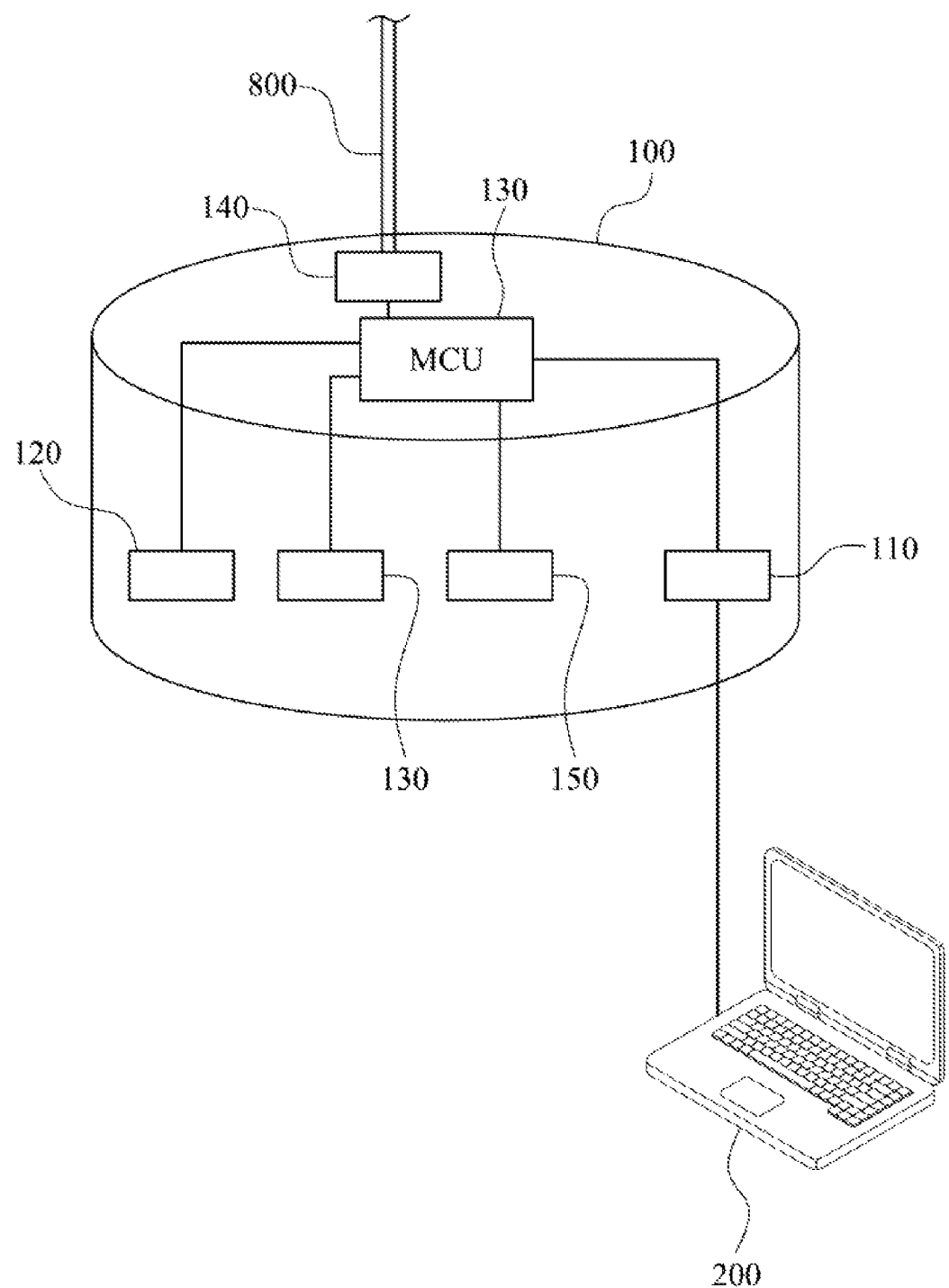
FIG. 3 is a schematic diagram of a docking device according to some other embodiments of the present disclosure.

FIG. 3 is a schematic diagram of a docking device according to another embodiment of the present disclosure. In the embodiment, the docking device 100 plays a role as a network adaptor. The laptop 200 in the configuration is a legitimate end having authenticated MAC (Media Access Control) address for accessing a network service through an Ethernet cable 800. The Ethernet cable 800 is coupled to the docking device 100 through the fourth coupling port 140. The laptop 200 is coupled to the docking device 100 through the first coupling port 110. A network security module of the network service is configured to retrieve and enamine the MAC address of the device connected to the Ethernet cable 800. If the docking device is a prior art, the MAC address retrieved by the network security module from the fourth coupling port 140 would be the MAC address of the docking device 100 instead of the authenticated MAC address of the laptop 200, thus the laptop 200 is unable to access the network service.

However, in the configuration of present disclosure, the MCU 160 is able to retrieve characteristic profile, which is the authenticated MAC address profile, stored in the first coupling port 110. The MCU 160 then changes the characteristic profile in the fourth coupling port 140 to the authenticated MAC address profile. When the network security module visits the fourth coupling port 140 of the docking device 100, the authenticated MAC address profile would be retrieved and the docking device 100 would be recognized as a legitimate end. Therefore, the laptop 200 is able to access the network service though it is not directly coupled to the Ethernet cable 800.

Figure 4:
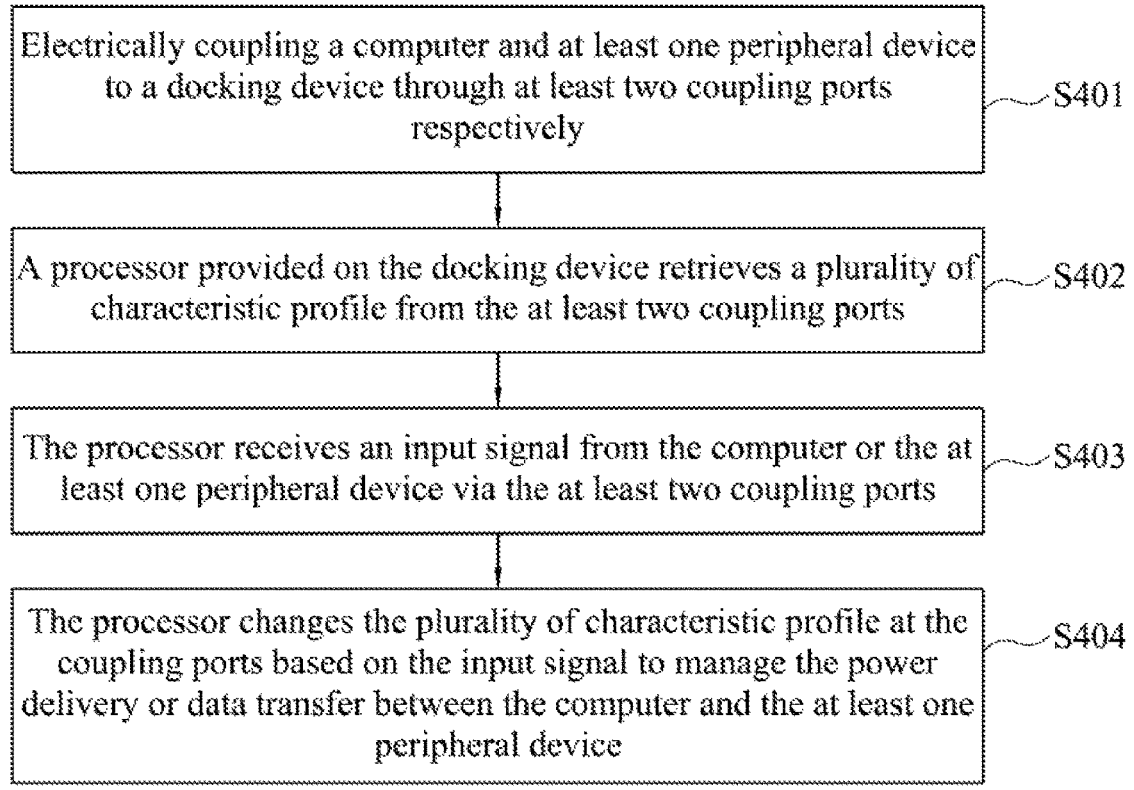
FIG. 4 is a flow chart of a method for managing a docking device according to some embodiments of the present disclosure.

FIG. 4 is a flow chart of a method for managing a docking device according to some embodiments of the present disclosure. The steps of the method will be listed and explained in detail in following segments.

Step S401: Electrically coupling a computer and/or at least one peripheral device to the docking device through at least two coupling ports on the docking device respectively. The computer is a laptop and the at least one peripheral device may be selected from a power supply, a mobile phone, a network security unit or other peripheral devices. In a configuration that the docking device having enough coupling ports, the aforementioned peripheral devices are able to be coupled to the docking device simultaneously. The coupling ports are provided to be coupled to different types of communication interfaces, such as USB Type-C, USB Type-A or power resources.

Step S402: A processor provided on the docking device retrieves a plurality of characteristic profiles from the coupling ports, wherein each of the characteristic profiles is generated and stored in corresponding coupling port when the computer or the peripheral devices being coupled to the docking device. The characteristic profiles are related to the available functions, operations, modes, capacities or demands of the computer and/or the peripheral devices. For example, a power supply supports USB Type-C power delivery standard being coupled to the docking device via a USB Type-C port. The characteristic profile such as a power delivery profile, a UFP (Upstream Facing Port) profile, a DFP (Downstream Facing Port) profile or a DRP (Dual Role Port) profile would be generated and stored in the USB Type-C port. For another example, a mobile phone is lacking in power being coupled to the docking device, a power demand profile would be generated and stored in the coupling port connected to the mobile phone. The plurality of characteristic profiles are determined in accordance with the available functions or modes of the computer or the at least one peripheral device through the coupling ports.

Step S403: The processor receives an input signal, via the coupling ports, from the computer or the peripheral device. The input signal comprises a command from the computer, a command from the peripheral device or a power current. In addition, a USB control module may be installed or embedded on the computer or the at least one peripheral device.

Step S404: The processor changes the characteristic profiles in the coupling ports based upon the input signal. The change is executed for managing the power delivery or data transfer between the computer and the peripheral device. In some embodiments of present disclosure, several peripheral devices being coupled to the docking device, the processor detects the power supplies and demands from these peripheral devices or computer according to the collected characteristic profiles. By changing the characteristic profiles at each coupling ports, the processor is able to distribute or redirect the power delivery among the peripheral devices or computers coupled to the docking device. In some embodiments of present disclosure, several peripheral devices being coupled to the docking device, the processor detects the data transfer rate or data communication from these peripheral devices or computers according to the collected characteristic profiles. By changing the characteristic profiles at each coupling ports, the processor is able to distribute or redirect the data transfer among the peripheral devices or computers coupled to the docking device.

In some embodiments of present disclosure, the characteristic profiles such as UFP (Upstream Facing Port) profiles, DFP (Downstream Facing Port) profiles or DRP (Dual Role Port) profiles stored in the coupling ports may be changed by the processor to switch the direction of the power delivery.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for managing a docking device having a processor and at least two coupling ports, comprising:
   electrically coupling a computer and at least one peripheral device to the at least two coupling ports respectively;
   retrieving, by the processor, a plurality of characteristic profiles, wherein each of the characteristic profiles is retrieved from each of the at least two coupling ports;
   receiving, by the processor, an input signal from the computer or the at least one peripheral device; and
   changing, by the processor, the characteristic profiles based on the input signal, wherein each of the computer and the peripheral device comprises a power requirement;
   wherein the processor is configured to detect a total power input from the at least two coupling ports and assign distribution and direction of power delivery to the computer and the at least one peripheral device, such that at least one of the computer and the peripheral device is assigned a lower power than the power requirement.

2. A method for managing a docking device having a processor and at least two coupling ports, comprising:
   electrically coupling a computer and at least one peripheral device to the at least two coupling ports respectively;
   retrieving, by the processor, a plurality of characteristic profiles, wherein each of the characteristic profiles is retrieved from each of the at least two coupling ports;
   receiving, by the processor, an input signal from the computer or the at least one peripheral device; and
   changing, by the processor, the characteristic profiles based on the input signal;
   wherein the at least two coupling ports include an Ethernet port, and one of the characteristic profiles corresponding to the Ethernet port comprises a MAC (Media Access Control) address profile.

3. The method of claim 2, wherein the input signal is selected from a group consisting of a command from the computer, a command from the at least one peripheral device, and a power current via the at least two coupling ports.

4. The method of claim 2, wherein the at least one peripheral device comprises a power supply.

5. The method of claim 2, wherein the computer and the at least one peripheral device further include a USB control module, and wherein the method further includes:
   sending, by the processor, the characteristic profiles to the USB control module.

6. The method of claim 2, wherein the at least one peripheral device includes a network security module, and one of the characteristic profiles retrieved from one of the at least two coupling ports coupled to the network security module comprises a MAC address profile.

7. A method for managing a docking device having a processor and at least two coupling ports, comprising:
   electrically coupling a computer and at least one peripheral device to the at least two coupling ports respectively;
   retrieving, by the processor, a plurality of characteristic profiles, wherein each of the characteristic profiles is retrieved from each of the at least two coupling ports;
   receiving, by the processor, an input signal from the computer or the at least one peripheral device; and
   changing, by the processor, the characteristic profiles based on the input signal, wherein each of the characteristic profiles is retrieved from each of the at least two coupling ports;
   wherein the at least two coupling ports include a VGA port, a HDMI port or a display port, and the characteristic profiles are corresponding to the VGA port, the HDMI port or the display port, wherein the characteristic profiles comprise a video resolution profile.

8. A docking device for coupling a computer and at least one peripheral device, comprising:
   at least two coupling ports configured to couple to the computer and the at least one peripheral device respectively; and
   a processor electrically connected to the at least two coupling ports, configured to retrieve a plurality of characteristic profiles from the at least two coupling ports, and receive an input signal from the computer or the at least one peripheral device;
   wherein each of the characteristic profiles is retrieved from each of the at least two coupling ports;
   wherein the processor is further configured to change the characteristic profiles based on the input signal, wherein each of the computer and the peripheral device comprises a power requirement;
   wherein the processor is further configured to detect a total power input from the at least two coupling ports and assign distribution and direction of power delivery to the computer and the at least one peripheral device, such that at least one of the computer and the peripheral device is assigned a lower power than the power requirement.

9. A docking device for coupling a computer and at least one peripheral device, comprising:
   at least two coupling ports configured to couple to the computer and the at least one peripheral device respectively; and
   a processor electrically connected to the at least two coupling ports, configured to retrieve a plurality of characteristic profiles from the at least two coupling ports, and receive an input signal from the computer or the at least one peripheral device;
   wherein each of the characteristic profiles is retrieved from each of the at least two coupling ports;
   wherein the processor is further configured to change the characteristic profiles based on the input signal;
   wherein the at least two coupling ports include an Ethernet port, and one of the characteristic profiles corresponding to the Ethernet port comprises a MAC (Media Access Control) address profile.

10. The docking device of claim 9, wherein the input signal is selected from a group consisting of a command from the computer, a command from the at least one peripheral device, and a power current via the at least two coupling ports.

11. The docking device of claim 9, wherein the at least one peripheral device comprises a power supply.

12. The docking device of claim 9, wherein the computer and the at least one peripheral device further include a USB control module, and wherein the processor is further configured to send the characteristic profiles to the USB control module.

13. The docking device of claim 9, wherein the at least one peripheral device includes a network security module, and one of the characteristic profiles retrieved from one of the at least two coupling ports coupled to the network security module comprises a MAC address profile.

14. A docking device for coupling a computer and at least one peripheral device, comprising:
- at least two coupling ports configured to couple to the computer and the at least one peripheral device respectively; and
- a processor electrically connected to the at least two coupling ports, configured to retrieve a plurality of characteristic profiles from the at least two coupling ports, and receive an input signal from the computer or the at least one peripheral device;
- wherein each of the characteristic profiles is retrieved from each of the at least two coupling ports;
- wherein the processor is further configured to change the characteristic profiles based on the input signal;
- wherein the at least two coupling ports include a VGA port, a HDMI port or a display port, and the characteristic profiles are corresponding to the VGA port, the HDMI port or the display port, wherein the characteristic profiles comprise a video resolution profile.

* * * * *